United States Patent [19]

Bryant, Sr.

[11] Patent Number: 4,831,736

[45] Date of Patent: May 23, 1989

[54] CARRIAGE FOR A COMPUTER MOUSE

[76] Inventor: William G. Bryant, Sr., 10231 Empress Ave., San Diego, Calif. 92126

[21] Appl. No.: 102,487

[22] Filed: Sep. 29, 1987

[51] Int. Cl.[4] .............................................. G06G 1/00
[52] U.S. Cl. ................................ 33/1 M; 74/471 XY; 340/709; 340/710
[58] Field of Search ..................... 33/1 M, 27.05, 32.3, 33/35; 340/710, 709; 74/471 XY

[56]  References Cited

U.S. PATENT DOCUMENTS 4,635,496  1/1987  McTyre ............................. 340/710

Primary Examiner—L. T. Hix
Assistant Examiner—Brian W. Brown
Attorney, Agent, or Firm—Frank D. Gilliam

[57] ABSTRACT

The invention is directed to a carriage for guiding a computer mouse. The bottom surface of the carriage is recessed for insertion of a computer mouse therein. The mouse is removably clamped in the recess to prevent relative movement to the carriage. The centrally positioned control ball of the mouse is free to operate in a conventional manner. Four rotatable wheels are carried by the carriage and are pivotally connected through a crank arm to a common free floating bracket. An adjustable clamp and biasing spring allow any configuration of a computer mouse to be removably clamped within the carriage. When a mouse is clamped within the carriage and oriented relative to an X/Y axis movement of the carriage and mouse in any direction does not change the original setting of the X/Y axis. The carriage further includes a cross-hair sight for accurately tracing a drawing with the mouse and carriage.

7 Claims, 1 Drawing Sheet

CARRIAGE FOR A COMPUTER MOUSE

BACKGROUND OF THE INVENTION

This invention is directed to the operation of a computer mouse, and more particularly to a carriage for containing a computer mouse therein that maintains the computer mouse on a true X/Y axis during its movement no matter how great or what angle.

Mice for use with a computer for moving the cursor are well known in the computer art. The mouse can move the cursor only on two axes. These axes are commonly referred to as the X and Y axis. Only a steady operator hand can move the mouse when the computer is in a graphic mode in the approximate desired direction. The reason being that the control ball of the mouse allows for inadvertent rotation of the mouse off of the true X/Y axis. In order to make free hand drawings with the movement of the mouse the screen of the computer must be watched at all times to insure that an approximate X/Y axis is maintained during mouse movement. A second problem that exists with the use of a mouse for graphics especially for tracing existing drawings or the like is that there is no means to accurately guide the movement of the mouse for tracing a drawing. Currently only free hand drawings can be made while watching the computer screen.

There is a long standing need in the computer art to provide a computer mouse that can be used to accurately trace a drawing and maintain the true X/Y axis without the necessity of the operator watching the computer screen during the tracing.

SUMMARY OF THE INVENTION

The invention is directed to a carriage for containing a computer mouse which operates in its normally expected manner. The carriage has an open bottom surface for receiving the mouse therein. An opening is provided in the cover of the carriage for exposing the user controls of the mouse and for the electrical control cable between the mouse and the computer to pass. An adjustable clamping means is employed to adjust the mouse holding means for any known mouse physical configuration. The adjustable clamping means includes a bracket with a substantially rectilinear back surface and a computer engaging front surface which is rectilinear on the outer end surfaces and centrally concave. An elongated arm extends centrally from the back surface of the engaging bracket and is fixedly attached to the bracket. A length adjustment screw is threaded into the distal end of the arm and extends through a bracket carried by the carriage. The screw is free to rotate relative to the carriage bracket. The distal end of the screw extending through the carriage bracket has a knob fixedly attached thereto to facilitate rotation of the screw into the elongated arm. A coil spring is positioned between the distal end of the elongated arm and the bracket carried by the carriage. This spring biases the mouse engaging bracket against the surface of the mouse. Thus when the mouse is inserted into the carriage one surface of the housing of the mouse is placed against the forward surface of the carriage mouse receiving opening and the screw is adjusted in length so that the mouse engaging bracket is firmly positioned against the surface of the mouse opposite to the carriage engaging surface. To remove the mouse from the carriage one needs only to force the mouse engaging bracket away from the mouse against the spring bias and pull the mouse downwardly from the carriage.

The bottom surface of the carriage includes four cylindrical pockets. An aperture extends through the center of the upper surface of each pocket. A circular wheel mount containing a vertically oriented wheel, and a wheel assembly having a pivot axle centrally located on the upper surface of the circular wheel mount. The axle extends through the aperture in the pocket. The distal end of the vertical axle has a crank arm fixedly attached thereto which extends on the same vertical plane as the rolling surface of the wheel. The distal end of the crank arm includes a vertical axle fixedly attached thereto. A free floating plate with four apertures spaced apart substantially the same as the apertures in the four cylindrical pockets is positioned over the cylindrical pockets with the distal end of crank arm vertical axle passing through the aperture in the free floating plate. With the plate installed, all of the wheels are parallel positioned and move together in a direction along parallel planes.

The side of the carriage opposite to the carriage bracket is extended to provide a cross-hair type sight for targeting an area of graphic rendering to be traced with the combined mouse and carriage movement.

The principle object of the invention is provide a carriage for a computer mouse which when manipulated will maintain an X/Y axes relationship.

Another object of this invention is to provide a mouse with a cross hair sighting means for tracing existing graphic renderings including means for maintaining the mouse on a true X/Y axis while tracing.

Other aspects and objects of the invention will appear to those skilled in the art.

DETAILED DESCRIPTION OF THE PREFERRED EMBODIMENT

Figure 1:
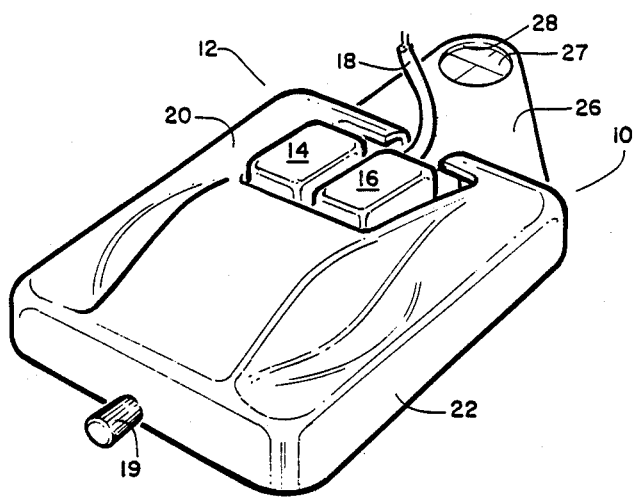
FIG. 1 is a top elevated perspective showing of the carriage with a computer mouse installed.

Referring to the drawing Figures and particularly to FIG. 1 which depicts an elevated perspective showing of the carriage 10 of the invention with a conventional computer mouse 12 installed therein and carried thereby. The manual control 14 and 16 and the computer hook up cable 18 extend through the upper surface 20 of the carriage cover 22. The upper surface of the carriage cover is formed to accommodate the upper surface of the mouse carried by the carriage. A conic shaped rotatable knob 19 carried with a rough or knurled outer surface protrudes from end 24 of the carriage. On the opposite end of the Figure an extension 26 extends beyond the cover 20 and includes a cross-hair type sighting means 27 positioned within an aperture 28 therethrough.

Figure 2:
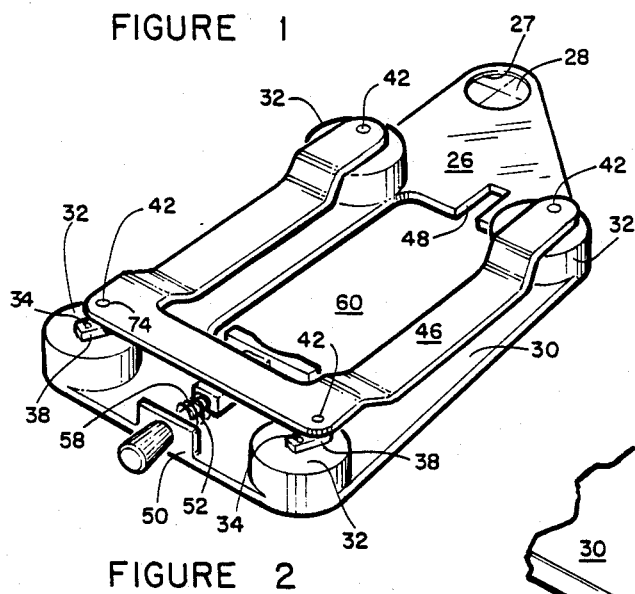
FIG. 2 is a showing similar to FIG. 1 with the upper cover and mouse removed from the carriage.
Figure 3:
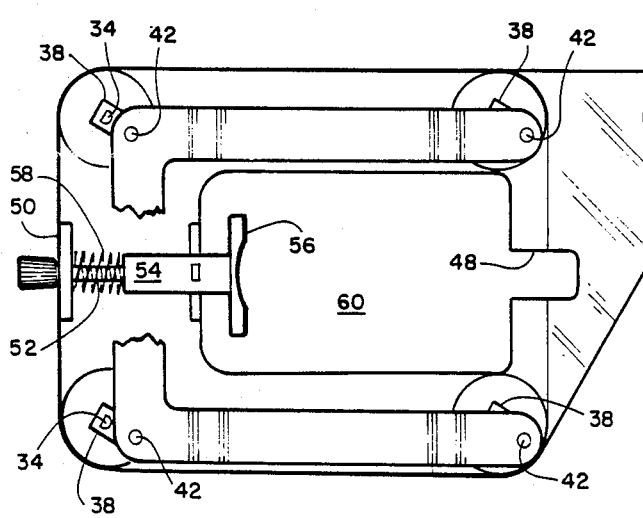
FIG. 3 is a plan view showing of FIG. 2.

Referring now to FIG. 2 and 3 which show the carriage without the cover 22 and the mouse 12 removed therefrom exposing the operating structure of the carriage. The cover fits over the carriage body 30 and is held to the outer surface thereof by fit friction. The carriage body 30 includes the extension 26 extending from one end thereof. Four wheel wells or pockets 32 are shown positioned in the carriage body 30 located to form a rectangle therebetween. A vertical wheel assembly axle 34 extends from a wheel assembly 36 positioned within the wheels of pockets herein after described in detail. Positioned on the distal end of each of the axles is a crank arm 38. Each of the crank arms 38 is fixedly attached on the distal end of the axle 34 to align with the direction of travel of the rolling edge of each associated wheel 40 (see FIG. 5). The distal ends of each crank arm 38 carries a crank arm axle 42. The crank arm axle extends through an aperture 44 located in a free floating plate 46. The free floating plate is held on the crank arm axles by gravity. A cutout 48 through the carriage body 30 provides a space for the computer hook up cable 18 to pass from the carriage. The opposite end of the carriage body includes an upstanding bracket 50 which rotatably supports an elongated screw 52 passing therethrough. The screw end protruding outwardly from the body 30 has the knob 19 attached thereto and the opposite end of the screw is threadedly attached to a rectangular extension 54 of a bracket 56. The bracket 56 includes a curvilinear central surface 58. The bracket 56 is adjustable by rotation of the knob 19 toward or away from cutout 48 to accommodate different configured mouse surfaces. The curvilinear surface accommodates any mouse that has a curvilinear bracket 56 abutting surface. A coil spring 58 is positioned between the inner surface of bracket 50 and the back distal end surface of extension 54. The coil spring biases the bracket 56 toward cutout 48. In practice the computer mouse is inserted into opening 60 through the body 30 pressed against the surface of the body having the cutout 48 and the knob 19 is rotated to snug bracket against the adjacent side of the mouse. The spring 58 maintains that snugness. To remove the mouse therefrom, the bracket 56 merely needs to be manually displaced toward bracket 50 against the spring bias and the mouse will become disengaged from the carriage 10.

Figure 4:
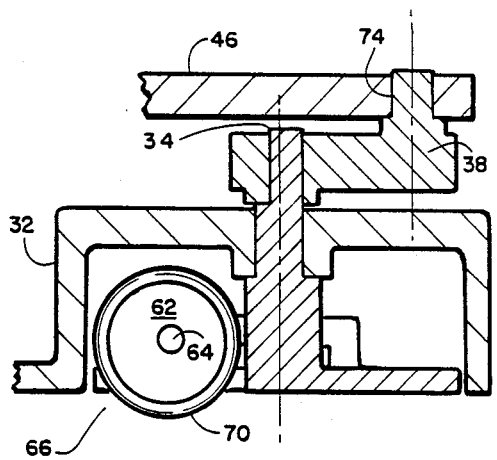
FIG. 4 is a cutaway showing of a wheel assembly of the carriage.
Figure 5:
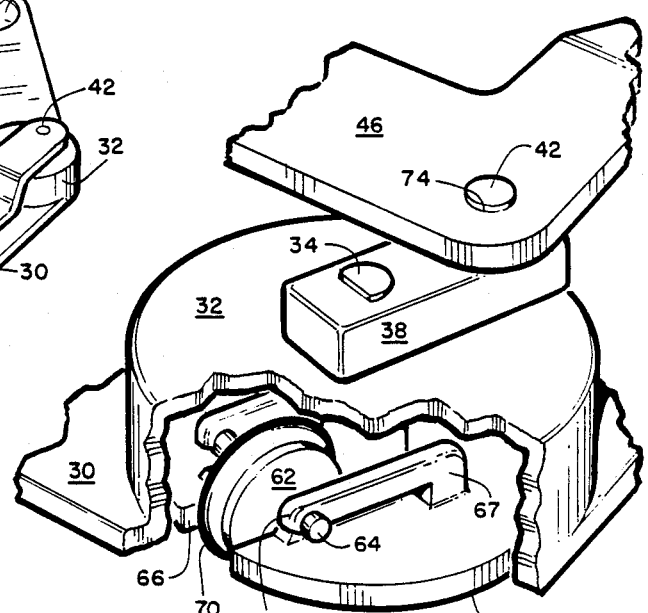
FIG. 5 is an elevated perspective showing partially in cutaway showing a wheel assembly of the carriage.
Figure 6:
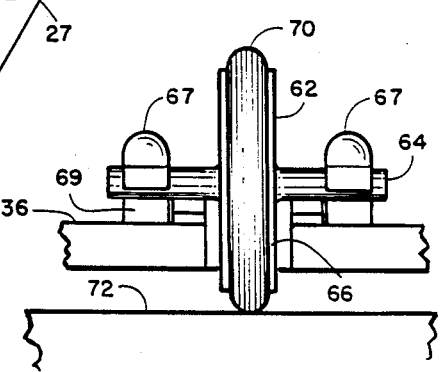
FIG. 6 is a detailed front showing of a wheel and supporting axle of the carriage.

Referring now to FIGS. 4 through 6 which show the wheel assembly and positioning maintenance of the direction of wheel travel in more detail. The wheel assembly 36 includes a circular bottom disk portion 61 which supports the wheel 62, wheel assembly axle 34, crank arm 38 and plate 46. The wheel 62 is supported by an axle shaft 64 which is either integral with the wheel and rotates therewith or passes through a center hub in the wheel and has relative rotation with the wheel. The body 30 includes a cutout 66 for wheel rotation therethrough. Positioned on the upper surface 68 of the disk 36 are a pair of wheel axle retaining members 67 positioned of each side of the cutout 66. The retaining members are attached adjacent the inside surface of the cutout at one end and immediately adjacent their attachment extends above the inside surface of the disk thereby providing a space between their lower surface and the disk surface. A curvilinear notch is provided adjacent to the distal end of the retaining members. A wheel axle stand 69 is fixedly attached to the surface of the disk and includes a curvilinear notch aligned with the notch in the upper surface of the retaining member. The two adjacent notches receive and bias the wheel axle within the curvilinear notches retaining the wheel axle thereby. The wheel axle retaining members are formed of sufficiently resilient material so that they can be spaced a distance from the disk surface less than the diameter of the wheel axle and displaced upwardly for wheel axle insertion into the notches and then return to a normal rest position biasing the wheel axle in the notches.

The wheel 62 includes a resilient tire or running surface 70 which is typically a rubber "O" ring or the like which will not readily slide relative to its supporting surface 72 during the carriage's normal expected operation. As can readily be seen in FIG. 5, the crank arm 38 is fixedly positioned in longitudinal alignment with the direction of travel of the tire or running surface 70 of wheel 62.

A "U" shaped free floating plate with four apertures 74 therethrough is positioned so that they substantially align with the center line of the wheel assembly shafts 42. The apertures are then slid over the crank arm axles for relative rotation therewith. It can be readily seen from the various Figures that all of the wheels remain in the same direction of travel regardless of that direction.

It should now be obvious that once the carriage and mouse assembly are oriented in the required X/Y axis movement thereof will not disturb this X/Y axis relationship. Accordingly, if a graphic rendering is being followed by alignment of the cross-hair therewith the screen need not be monitored for the purpose of maintaining the X/Y axis relationship.

The carriage components may be constructed from any material suitable for the purpose intended. It has been found that all of the components of the carriage except the tires and free floating plate can be injection molded from a suitable plastic material. The tire should be constructed of a soft resilient material such as rubber hereinbefore mentioned. The free floating plate should be made of metal or a ridged plastic material so that it has sufficient strength to control the wheel movement in unison and not distort which would allow the wheels to drift slightly in different directions.

Although the invention has been described with reference to a particular illustrative example, it would be recognized that modifications and variations are possible with the inventive concept.

I claim:

1. A carriage for use with a computer mouse, said carriage comprising:
   a body member;
   a plurality of wheel members rotatably carried by said body member;
   means interconnecting said plurality of wheel members for maintaining substantially the same direction of travel for all of said plurality of wheel members regardless of the direction of travel of said mouse; and
   means for attaching said mouse to said carriage in an operable manner while being supported upon a working surface by said plurality of wheel members.

2. The invention as defined in claim 1 additionally comprising a sighting means attached to said body member for guiding said carriage over a chosen path and direction of travel;

3. The invention as defined in claim 1 wherein when said carriage is placed in a selected position relative to an X and Y axis and said carriage is moved along a supporting surface in any chosen direction said selected position relative to said X and Y axis is always maintained.

4. The invention as defined in claim 1 additionally comprises a cover which encloses the upper surface of said carriage and is attached thereto by attachment means.

5. The invention as defined in claim 1 wherein said means for attaching said mouse to said carriage comprises a length adjustable means which is spring biased against one surface of said mouse with the opposite surface of the mouse held against thereagainst said carriage.

6. The invention as defined in claim 1 wherein said plurality of wheel members number four and said means interconnecting said plurality of wheel members for maintaining said plurality of wheel members substantially in the same direction comprises a "U" shaped plate member pivotally attached to crank arms fixedly connected to and aligned with the direction of travel of said wheel members whereby all of said wheel members are maintained in the same direction of travel.

7. The invention as defined in claim 1 wherein each of said wheel members comprise a wheel with a resilient outer surface rotatably supported on an axle, said axle is rotatably supported on a wheel assembly support surface by resilient open clamp means.

* * * * *